(12) United States Patent
Helmersson et al.

(10) Patent No.: US 11,373,764 B2
(45) Date of Patent: Jun. 28, 2022

(54) FUEL ASSEMBLY HAVING CONCENTRIC LOWER COOLANT INLET TUBES

(71) Applicant: WESTINGHOUSE ELECTRIC SWEDEN AB, Västerås (SE)

(72) Inventors: Sture Helmersson, Hallstahammar (SE); Jeremy King, Chapin, SC (US)

(73) Assignee: Westinghouse Electric Sweden AB, Vasteras (SE)

( * ) Notice: Subject to any disclaimer, the term of this patent is extended or adjusted under 35 U.S.C. 154(b) by 382 days.

(21) Appl. No.: 16/330,487

(22) PCT Filed: Feb. 20, 2017

(86) PCT No.: PCT/EP2017/053753
§ 371 (c)(1),
(2) Date: Mar. 5, 2019

(87) PCT Pub. No.: WO2018/046143
PCT Pub. Date: Mar. 15, 2018

(65) Prior Publication Data
US 2019/0228869 A1 Jul. 25, 2019

Related U.S. Application Data

(60) Provisional application No. 62/383,754, filed on Sep. 6, 2016.

(51) Int. Cl.
*G21C 3/33* (2006.01)
*G21C 3/32* (2006.01)
(Continued)

(52) U.S. Cl.
CPC ........... *G21C 3/3206* (2013.01); *G21C 3/322* (2013.01); *G21C 3/3225* (2019.01); *G21C 17/10* (2013.01); *G21C 3/3305* (2013.01); *Y02E 30/30* (2013.01)

(58) Field of Classification Search
CPC ...... G21C 3/3206; G21C 3/3305; G21C 3/22; G21C 3/322; G21C 3/3225
See application file for complete search history.

(56) References Cited

U.S. PATENT DOCUMENTS 4,675,154 A * 6/1987 Nelson .................. G21C 3/322
376/444
5,553,108 A * 9/1996 Johansson ............ G21C 3/3305
376/444

(Continued)

FOREIGN PATENT DOCUMENTS

EP 0465925 A1 * 1/1992 ............. G21C 3/322
EP 0798745 A1 * 10/1997 ............. G21C 3/328

(Continued)

OTHER PUBLICATIONS

International Search Report issued in corresponding PCT Application No. PCT/EP2017/053753, dated May 24, 2017, pp. 1-3.
(Continued)

*Primary Examiner* — Lily C Garner
(74) *Attorney, Agent, or Firm* — Murtha Cullina LLP

(57) ABSTRACT

A fuel assembly for a nuclear reactor having an upstream minor portion defining an upstream end, a main portion, and a downstream minor portion defining a downstream end. Fuel rods extend in a flow interspace permitting a flow of coolant through the fuel assembly in contact with the fuel rods. Two elongated tubes form a respective internal passage extending in parallel with the fuel rods and enclosing a stream of the coolant. Each elongated tube having a bottom, an inlet at the upstream minor portion and an outlet at the downstream minor portion. Each elongated tube having an inlet pipe having an inlet end and an outlet end in the internal passage at a distance from the bottom, thereby forming a space in the internal passage between the outlet end and the bottom.

14 Claims, 6 Drawing Sheets

(51) Int. Cl.
      *G21C 17/10*       (2006.01)
      *G21C 3/322*       (2006.01)

(56) References Cited

U.S. PATENT DOCUMENTS

| | | | |
|---|---|---|---|
| 5,663,993 A * | 9/1997 | Danielson | G21C 3/322 376/444 |
| 6,175,606 B1 | 1/2001 | Soderberg | |
| 2003/0128798 A1 * | 7/2003 | Kageyama | G21C 3/3206 376/310 |
| 2013/0272479 A1 | 10/2013 | Kuo et al. | |
| 2019/0198183 A1 * | 6/2019 | Soderberg | G21C 3/3305 |

FOREIGN PATENT DOCUMENTS

| | | | |
|---|---|---|---|
| EP | 0798745 A1 | | 10/1997 |
| JP | 2004077127 A | * | 3/2004 |
| JP | 2011247651 A | | 12/2011 |
| WO | 9828752 A1 | | 7/1998 |

OTHER PUBLICATIONS

International Preliminary Report on Patentability and Written Opinion issued in corresponding PCT Application No. PCT/EP2017/053753, dated Mar. 12, 2019, pp. 1-10.

\* cited by examiner

FUEL ASSEMBLY HAVING CONCENTRIC LOWER COOLANT INLET TUBES

TECHNICAL FIELD OF THE INVENTION

The present invention refers to a fuel assembly configured to be positioned in a nuclear water reactor, especially a heavy water reactor or a light water reactor, LWR, such as a boiling water reactor, BWR, or a pressurized water reactor, PWR, of a nuclear plant.

More precisely, the present invention refers to a fuel assembly configured to be positioned in a nuclear water reactor, comprising an upstream minor portion defining an upstream end, a downstream minor portion defining a downstream end, a main portion connecting the upstream portion and the downstream portion, a plurality of elongated fuel rods arranged in parallel with a longitudinal axis extending through the upstream end and the downstream end, a flow interspace between the upstream end and the downstream end, the flow interspace being configured to permit a flow of coolant through the fuel assembly along a flow direction from the upstream end to the downstream end in contact with the fuel rods, and at least one elongated tube forming an internal passage extending through the main portion in parallel with the fuel rods and permitting a stream of the coolant through the internal passage, wherein the elongated tube comprises a bottom, an inlet to the internal passage at the upstream portion and an outlet from the internal passage at the downstream portion.

The purpose of the elongated tube, permitting a stream of the coolant through the internal passage, may be to provide non-boiling moderating water in the fuel assembly, or to provide a guide for a control rod to be introduced into the fuel assembly when the operation of the nuclear water reactor is to be interrupted.

The elongated tube may have different cross-sectional shapes, such as a circular shape, an oval shape, a polygonal shape, a cruciform shape, etc.

BACKGROUND OF THE INVENTION AND PRIOR ART

US 2003/0128798 discloses a fuel assembly for a nuclear water reactor. The fuel assembly comprises a lower tie plate with a screening plate positioned below a network section in the lower tie plate cavity. The screening plate is arranged substantially horizontally so that the lower tie plate is divided into upper and lower parts by the screening plate. Tubular filters are attached to the screening plate so that the tubular filters have openings below and above the screening plate. The top ends of the tubular filters are closed.

U.S. Pat. No. 6,175,606 discloses a fuel assembly for a nuclear reactor, comprising a plurality of fuel rods and a debris filter, which is provided in the flow of coolant between an upstream end and the fuel rods, and configured to catch debris particles in the coolant flow. The filter device comprises a plurality of through-holes for the coolant.

The purpose of the coolant in a nuclear water reactor is to function as a cooling fluid and a moderator. It is important to secure a flow of the coolant through the fuel assembly in order to ensure a proper cooling of the fuel and a proper moderation of the neutrons.

The purpose of the tubular filters and the debris filter, discussed above, is to catch debris particles in the coolant, and thus to prevent debris particles from being caught at a higher position in the fuel assembly, especially in the spacers where the debris particles may cause fretting on the cladding of the fuel rods. Fretting may result in a primary defect, a small hole through the cladding, and at a later stage in a secondary defect, i.e. break of the fuel rod, which may cause uranium leakage into the coolant. In case of a secondary defect, the operation of the reactor has to be interrupted and the failed fuel rod be replaced. Such a replacement is time-consuming and expensive. Debris particles in the coolant may of course also cause defects to other components in a nuclear plant, for instance pumps.

The debris filters, used in the fuel assemblies that are marketed and sold today, are dimensioned to catch debris particles above a certain size, for instance, approximately 7 mm if the particles are wire particles. Smaller debris particles are regarded harmless and/or have a low probability to get caught in the spacers. A problem is that such smaller debris particles will circulate indefinitely, and albeit the probability to get caught is low, the debris particles will have millions of chances to get caught. There is no natural sink for such circulating smaller debris particles in the reactor.

SUMMARY OF THE INVENTION

An object of the present invention is to remedy the problems discussed above and to provide a natural sink for debris particles, in particular small debris particles which are not caught by the debris filter.

This object is achieved by the fuel assembly initially defined, which is characterized in that the elongated tube comprises an inlet pipe forming the inlet, that the inlet pipe has an inlet end and an outlet end, that the outlet end is located inside the internal passage at a distance from the bottom, thereby forming a space in the internal passage between the outlet end and the bottom.

By means of such an inlet pipe extending into the elongated tube, debris particles, in particular small debris particles, which are brought by the coolant into the internal passage, may in an efficient manner be caught in the space immediately above the bottom of the elongated tube.

When leaving the outlet end of the inlet pipe and entering the internal passage, a wake, or local sub-pressure, will be formed in the internal passage permitting any possible particles to be separated from the coolant stream and to sink towards the bottom into the space, where they will remain. They will thus be prevented from causing any defects to the fuel assembly, and to any further components of the nuclear plant.

According to an embodiment of the invention, the elongated tube has an inner diameter, wherein the inlet pipe at the outlet end has an outer diameter being smaller than the inner diameter of the elongated tube. Consequently, the inlet pipe will have a flow area which is smaller than the flow area of the inner passage, and thus the velocity of the coolant stream will decrease when the coolant enters the internal passage, causing a pressure drop. In such a way said wake or local sub-pressure will be ensured.

According to a further embodiment of the invention, the inlet end forms an opening which extends along or in a plane being non-parallel to the longitudinal axis. The opening of the inlet end of the inlet pipe will thus be directed towards the flow of coolant, which ensures entrance of a significant stream of coolant into the inlet pipe and the internal passage. Advantageously, the plane of the opening may extend transversally to the longitudinal axis, and thus to the flow of coolant. In particular, the plane of the opening may be perpendicular, or substantially perpendicular, to the longitudinal axis.

According to a further embodiment of the invention, the inlet pipe extends through the bottom. This is advantageous from a manufacturing point of view. Furthermore, such an extension of the inlet pipe may minimize the space required for the inlet pipe outside the elongated tube, and thus any negative influence on the flow of coolant.

According to a further embodiment of the invention, the space is an annular space around the inlet pipe.

According to a further embodiment of the invention, the inlet pipe is concentric with the elongated tube.

According to a further embodiment of the invention, the elongated tube comprises a bottom end plug forming said bottom, wherein the inlet pipe extends through the bottom end plug. The inlet pipe and the bottom end plug may thus form a common element, which may be attached to the end of the elongated tube in a convenient manner.

According to a further embodiment of the invention, the outlet end is located a distance of at least 0.2 m downstream the bottom. Thus the space will have a height of at least 0.2 m, which is regarded to be sufficient to create a sufficient sub-pressure to permit possible debris particles to sink to the bottom of the elongated tube. Preferably, the distance is at least 0.3 m, more preferably at least 0.4 m and most preferably at least 0.5 m.

According to a further embodiment of the invention, the elongated tube is cylindrical.

According to a further embodiment of the invention, the elongated tube may have a circular cross-section. However, the elongated tube may have any possible cross-section, such as an oval cross-section, a square or rectangular cross-section, a triangular cross-section, a polygonal cross-section, or a cruciform cross-section.

According to a further embodiment of the invention, the elongated tube comprises at least one magnet provided to attract magnetic material towards the bottom. Such at least one magnet may comprise a permanent magnet, but also an electromagnet may be possible.

According to a further embodiment, the at least one magnet may comprise one, two, three, four or even more magnets arranged at the bottom of the elongated tube.

According to a further embodiment of the invention, the fuel assembly comprises a debris filter at or in the upstream minor portion upstream the fuel rods. Such a debris filter will catch all debris particles above a certain size.

According to a further embodiment of the invention, the inlet end is located upstream the debris filter. In this case, the inlet pipe will thus extend through the debris filter. All debris particles may thus be collected in the space of the elongated tube.

According to a further embodiment of the invention, the inlet end is located downstream the debris filter. In this variant, only debris particles not caught by the debris filter, i.e. relatively small debris particles, will be collected in the space of the elongated tube.

According to a further embodiment of the invention, the fuel assembly is configured to be positioned in a boiling water reactor, wherein the elongated tube comprises a water rod for conveying non-boiling water through the internal passage.

According to a further embodiment of the invention, the fuel assembly comprises at least two elongated tubes each comprising a water rod for conveying non-boiling water through the respective internal passage. For instance, the fuel assembly may comprise three elongated tubes, each comprising a water rod for conveying non-boiling water through the respective internal passage.

According to a further embodiment of the invention, the fuel assembly is configured to be positioned in a pressure water reactor, wherein the elongated tube comprises a guide tube for receiving a control rod. For instance, the fuel assembly may comprise a plurality of elongated tubes each comprising a guide tube for receiving a respective control rod.

BRIEF DESCRIPTION OF THE DRAWINGS

The present invention is now to be explained more closely through a description of various embodiments and with reference to the drawings attached hereto.

DETAILED DESCRIPTION

Figure 1:
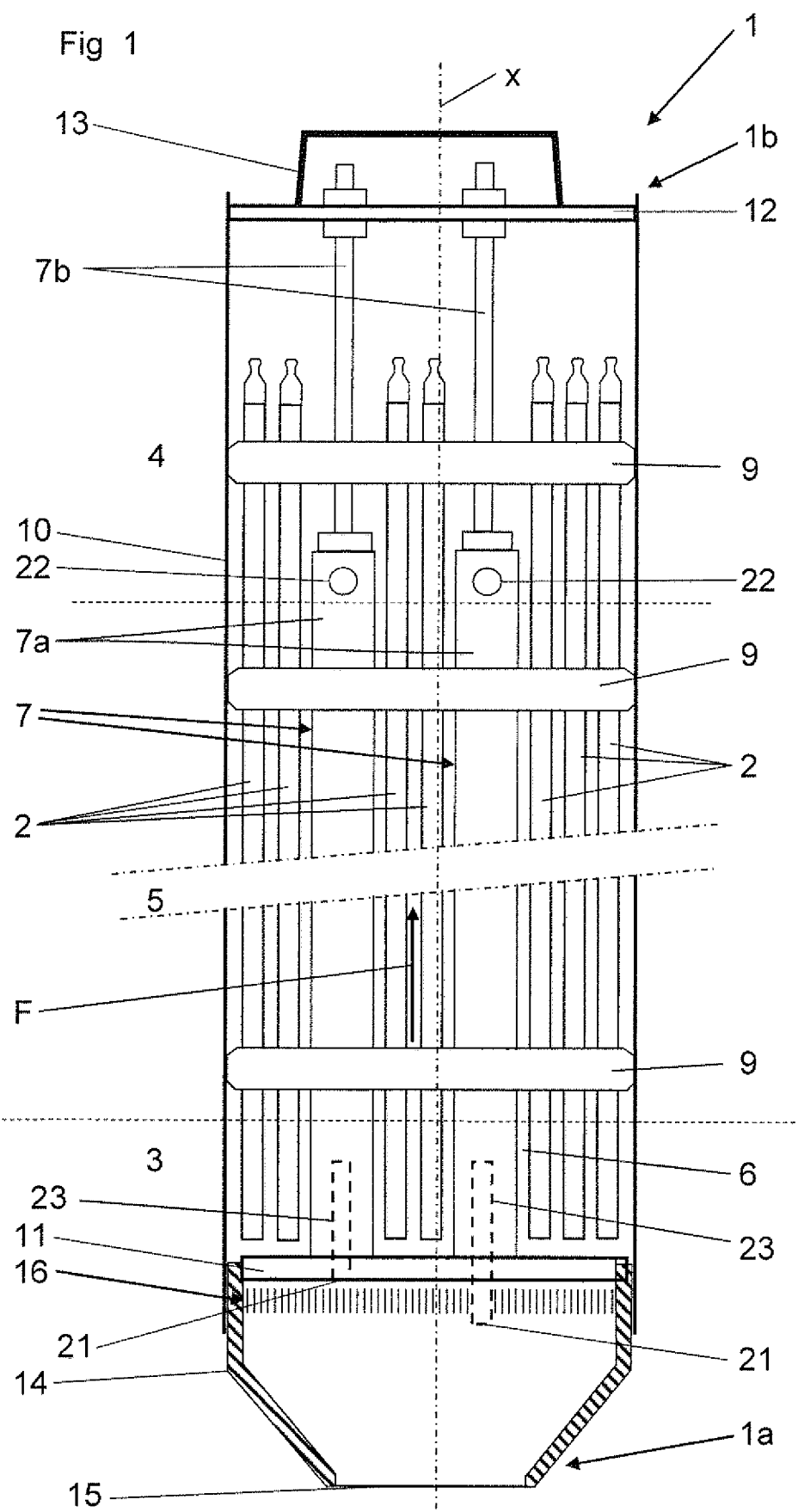
FIG. 1 discloses schematically a longitudinal section through a fuel assembly according to a first embodiment and a second embodiment of the invention.

FIG. 1 discloses a first embodiment of a fuel assembly 1 configured to be positioned in a nuclear water reactor, and more precisely a boiling water reactor, BWR. The fuel assembly 1 has an elongated shape and extends along a longitudinal axis x between an upstream end 1a and a downstream end 1b of the fuel assembly 1. During normal use of the fuel assembly 1 in the reactor, the upstream end 1a forms a lower end, whereas the downstream end 1b forms an upper end of the fuel assembly 1.

A plurality of elongated fuel rods 2 are arranged in parallel with the longitudinal axis x. Each fuel rod 2 comprises a cladding tube and nuclear fuel (not disclosed), for instance in the form of fuel pellets, contained in the cladding tube.

The fuel rods 2 may comprise full length fuel rods and part length fuel rods. The part length fuel rods may for instance have a length being ⅓ and/or ⅔ of the length of the full length fuel rods. Only full length fuel rods are shown in FIG. 1.

The fuel assembly 1 comprises an upstream minor portion 3 defining the upstream end 1a, and a downstream minor portion 4 defining the downstream end 1b. A main portion 5 is provided between and connects the upstream minor portion 3 and the downstream minor portion 4. The borders between the main portion 5 and the upstream minor portion 3, and between the main portion 5 and the downstream minor portion 4 are indicated by dashed transversal lines in FIG. 1.

The main portion 5 has an axial length being longer than the axial length of each of the upstream minor portion 3 and the downstream minor portion 4.

The axial length of the main portion 5 may also be longer than the sum of the axial lengths of the upstream minor portion 3 and the downstream minor portion 4.

The fuel assembly 1 defines a flow interspace 6 between the upstream end 1a and the downstream end 1b. The flow interspace 6 is configured to permit a flow of coolant through the fuel assembly 1 along a flow direction F from the upstream end 1a to the downstream end 1b in contact with the fuel rods 2.

Figure 2:
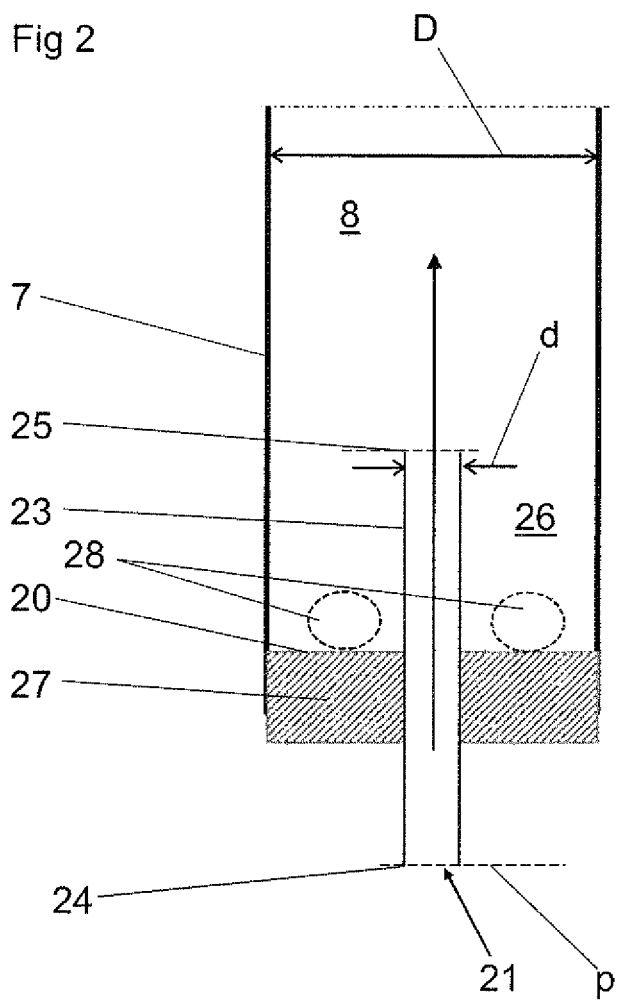
FIG. 2 discloses schematically a longitudinal section through a part of an elongated tube of the fuel assembly in FIG. 1.

In the first embodiment, the fuel assembly 1 also comprises two elongated tubes 7 forming a respective internal passage 8, see FIG. 2, extending through the main portion 5 in parallel with the fuel rods 2. The elongated tubes 7 permit a stream of the coolant through the respective internal passage 8. In the first embodiment, the elongated tubes 7 form so called water rods enclosing the stream of coolant, especially of non-boiling water. It should be noted that the number of elongated tubes 7 may be another than two, for instance one, three, four, five, six or more.

In the first embodiment, the elongated tubes 7 are cylindrical. In particular, the elongated tubes 7 may have a circular cross-section.

The fuel rods 2 are held by means of spacers 9 in a manner known per se. In the first embodiment, the spacers 9 are attached to the elongated tubes 7.

The fuel assembly 1 of the first embodiment also comprises a casing 10 enclosing the fuel rods 2, the spacers 9 and the flow interspace 6.

The elongated tubes 7 are attached to a bottom plate 11 provided beneath the fuel rods 2.

Furthermore, the elongated tubes 7 may also be attached to a top plate 12 at the downstream end 1a. The top plate 12 comprises a handle 13. The bottom plate 11, the elongated tubes 7, the top plate 12 and the spacers 9 form a support structure. The support structure may be lifted via the handle 13 and carries the weight of the fuel rods 2.

In the first embodiment, each elongated tube 7 comprises a tube part 7a attached to the bottom plate 11, and a solid part 7b forming a massive rod attached to the top plate 12 as can be seen in FIG. 1.

The fuel assembly 1 comprises a bottom piece 14, frequently designated as a transition piece. The bottom piece 14 extends to the upstream end 1a and defines an inlet opening 15 for the flow of coolant. The bottom piece 14 may be attached to the bottom plate 11 or to the casing 10.

The fuel assembly 1 comprises a debris filter 16 at or in the upstream minor portion 3 upstream the fuel rods 2. The debris filter 16 is provided between the upstream end 1a and the fuel rods 2. In the first embodiment, the debris filter 16 is provided between the upstream end 1a and the bottom plate 8. The debris filter 16 may be supported by or attached to the bottom piece 11.

In the first embodiment, each of the elongated tube 7 comprises a bottom 20, an inlet 21 to the internal passage 8 at the upstream minor portion 3 and an outlet 22 from the internal passage 8 at the downstream minor portion 4. The outlet 22 is located at the downstream end of the tube part 7a of the elongated tube 7.

The elongated tube 7 also comprises an inlet pipe 23, which forms the inlet 21 to the internal passage 8, as can be seen in FIG. 2. Advantageously, the flow area of the inlet 21 is smaller than the flow area of the outlet 22.

The inlet pipe 23 has an inlet end 24 and an outlet end 25. The outlet end 25 is located inside the internal passage 8 at a distance from the bottom 20. In such a way, a space 26 is formed in the internal passage 8 between the outlet end 25 and the bottom 20.

The elongated tube 7 has an inner diameter D. The inlet pipe 23 at the outlet end 25 has an outer diameter d, which is smaller than the inner diameter D of the elongated tube 7.

The inlet end 24 of the inlet pip 23 forms an opening which extends along a plane p which is non-parallel to the longitudinal axis x. In the first embodiment, the plane p is perpendicular to the longitudinal axis x.

In the first embodiment, the inlet pipe 23 extends through the bottom 20 of the elongated tube 7, and especially concentrically through the bottom 20.

In the first embodiment, the space 26 mentioned above is an annular space around the inlet pipe 23 of the elongated tube 7.

The elongated tube 7 comprises a bottom end plug 27, which forms the bottom 20. The inlet pipe 23 thus extends through the bottom end plug 27. The inlet pipe 23 and the bottom end plug 27 mays form a common element, which is attached to the end of the elongated tube 7, for instance by being inserted and welded.

The outlet end 25 of the inlet pipe 23 is located at a distance from the bottom 20. In particular, the outlet end 25 is located 0.2 m, or at least 0.2 m, downstream the bottom 20.

More specifically, the distance downstream the bottom 20 may be at least 0.3 m, at least 0.4 m or at least 0.5 m.

The distance downstream the bottom 20 may be at the most 1 m.

Furthermore, the elongated tube 7 may optionally comprise at least one magnet 28 provided to attract magnetic material, i.e. magnetic debris particles, towards the bottom 20. In the first embodiment, two magnets 28 are indicated, but one, three, four, five or oven more magnets may be provided close to the bottom 20. The magnets are located in the space 26. The magnets 28 may be permanent magnets.

The magnet or magnets 28 may have any suitable shape, for instance one annular magnet provided around the inlet pipe 28 would be possible.

In the first embodiment, the inlet end 24 of the inlet pipe 23 is located upstream the debris filter 16. This is illustrated for the inlet pipe 23 to the right in FIG. 1.

In a second embodiment, the inlet end 24 of the inlet pipe 23 is located downstream the debris filter 16. This is illustrated for the inlet pipe 23 to the left in FIG. 1. In the second embodiment, the inlet end may be located at an upstream side of the bottom plate 11.

Figure 3:
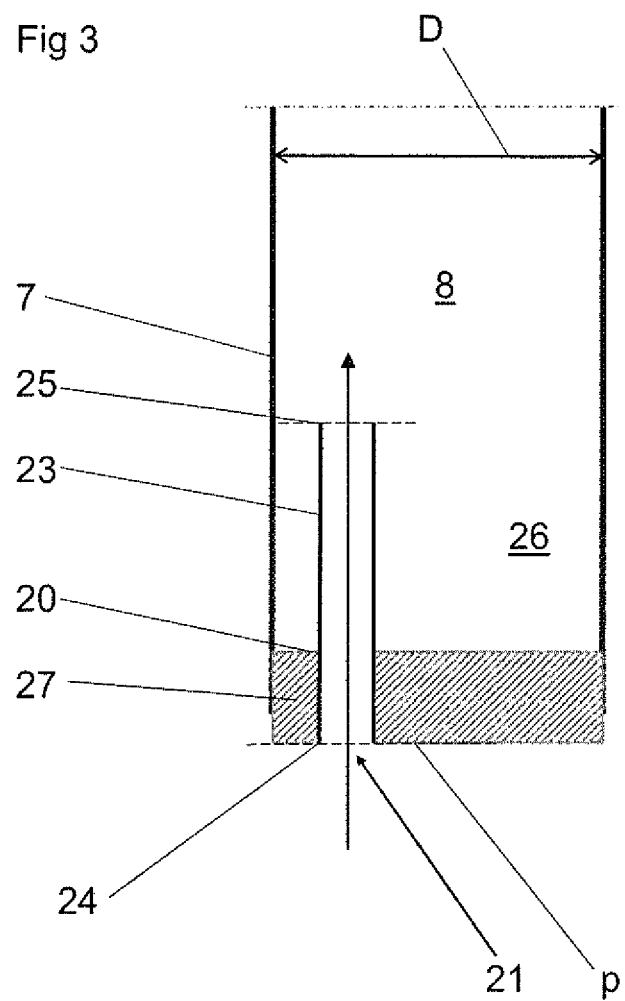
FIG. 3 discloses schematically a longitudinal section through a part of an elongated tube of a fuel assembly according to a third embodiment of the invention.

FIG. 3 illustrates a third embodiment, which differs from the first embodiment in that the inlet pipe 23 extends eccentrically in the internal space 8 of the elongated tube 7. Furthermore, the inlet end 24 of the inlet pipe 23 is located at the upstream surface of the bottom plug 27. The inlet end 24 is thus located downstream the debris filter 16, and possibly also downstream the bottom plate 11 depending on how the elongated tube 7 is attached to the bottom plate 11.

Figure 4:
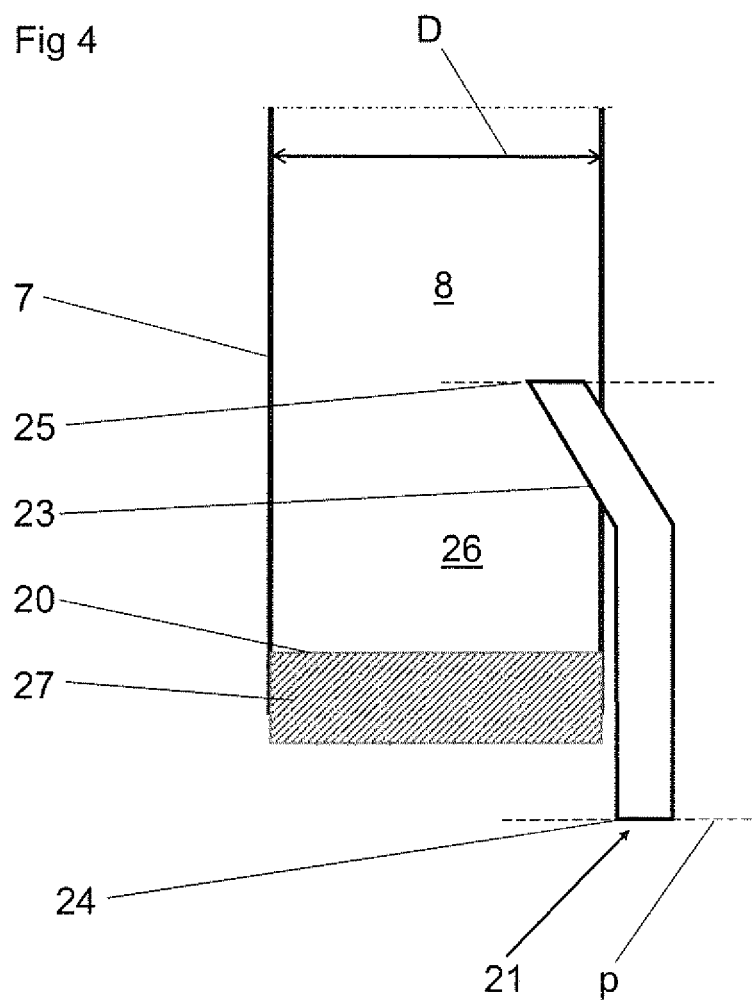
FIG. 4 discloses schematically a longitudinal section through a part of an elongated tube of a fuel assembly according to a fourth embodiment of the invention.

FIG. 4 illustrates a fourth embodiment, which differs from the first embodiment in that the inlet pipe 23 is curved or angled. The inlet pipe 23 extends through the side of the elongated tube 7 into the internal passage 8, as can be seen in FIG. 4. The space 26 is thus not annular.

Figure 5:
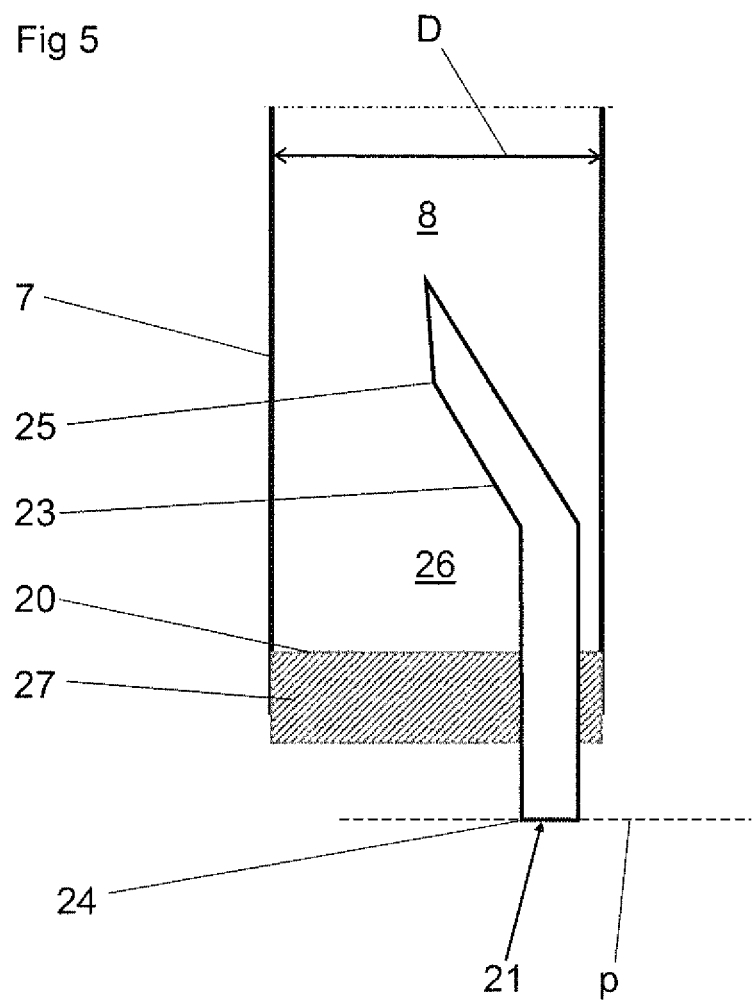
FIG. 5 discloses schematically a longitudinal section through a part of an elongated tube of a fuel assembly according to a fifth embodiment of the invention.

FIG. 5 illustrates a fifth embodiment, which differs from the first embodiment in that the inlet pipe 23 is curved or angled. However, the inlet pipe 23 extends eccentrically through the bottom 20, and through the bottom plug 27. Furthermore, the outlet end 25 of the inlet pipe 23 extends vertically, or substantially vertically.

It is to be noted, the configuration of the inlet pipe 23 may be further modified. Especially, all the various features of the inlet pipe 23 and its attachment to the elongated tube 7 shown in the first to fifth embodiments may be combined with each other.

Figure 6:
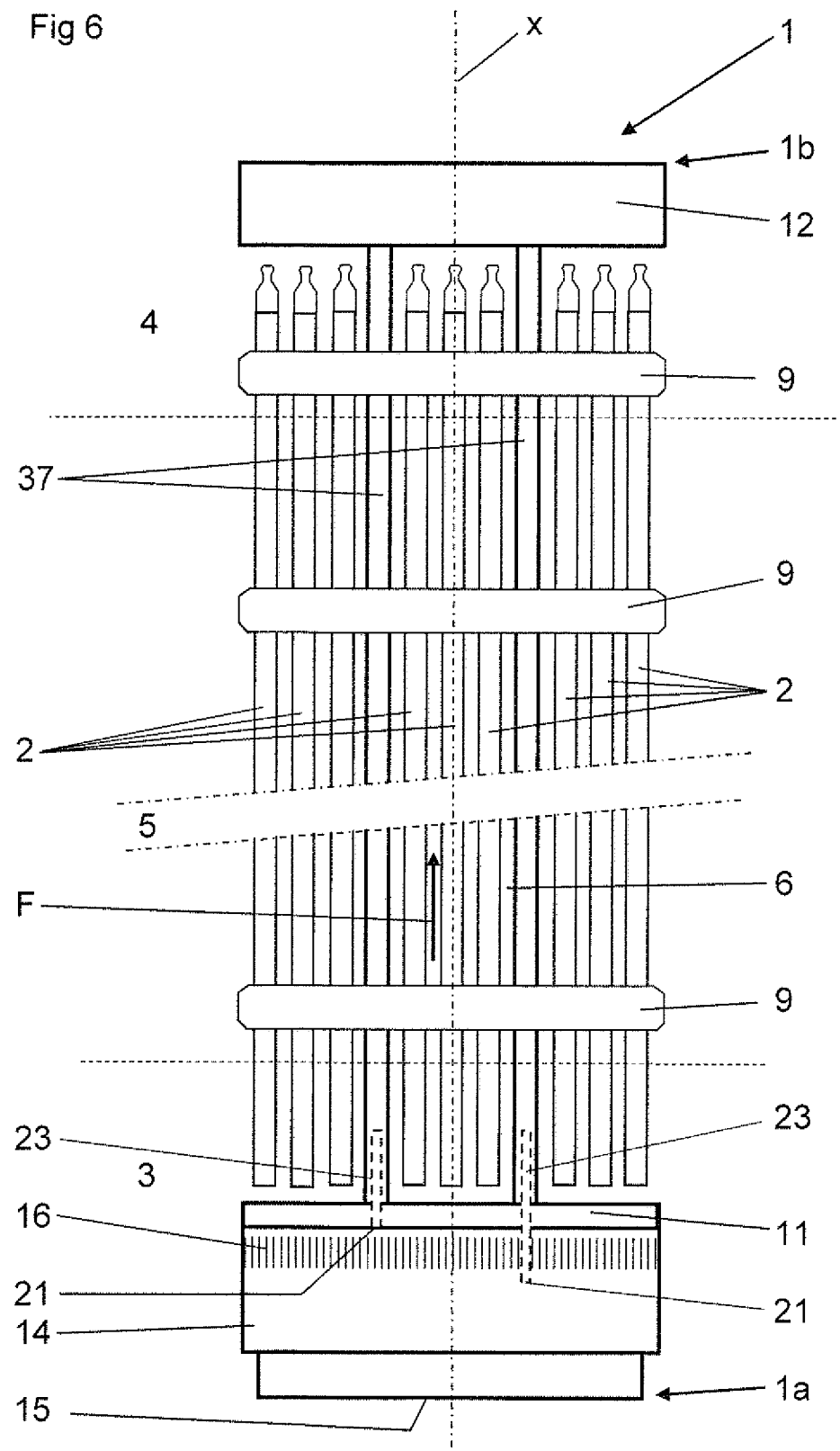
FIG. 6 discloses schematically a longitudinal section through a fuel assembly according to a sixth embodiment and a seventh embodiment of the invention.

FIG. 6 illustrates a sixth embodiment, which differs from the first embodiment in that the fuel assembly 1 is configured to be positioned in a pressure water reactor.

It should be noted, that the same reference signs have been used for similar or corresponding elements in all the embodiments disclosed.

Also the fuel assembly 1 according to the sixth embodiment has an elongated shape and extends along a longitudinal axis x between an upstream end 1a and a downstream end 1b of the fuel assembly 1. During normal use of the fuel assembly 1 in the reactor, the upstream end 1a forms a lower end and the downstream end 1b forms an upper end of the fuel assembly 1. A flow interspace 6 is provided between the upstream end 1a and the downstream end 1b.

A plurality of fuel rods 2 is provided in the flow interspace 6 between the upstream end 1a and the downstream end 1b. The fuel rods 2 are held by means of spacers 9. In the sixth embodiment, the spacers 9 are attached to a number of elongated tubes 37, two of which are shown in FIG. 6. The elongated tubes 37 form a respective internal passage 8 extending through a main portion 5 in parallel with the fuel rods 2 and permitting a stream of the coolant through the internal passage 8. Each elongated tube 37 forms a so called guide tube configured to receive a control rod when the operation of the PWR is to be interrupted. The control rods are introduced into the elongated tubes 37 from the downstream end 1b, i.e. from above.

In contrast to a fuel assembly 1 for a BWR, the fuel assembly 1 according to the sixth embodiment has no casing, but still comprises the flow interspace 6 as explained above.

The elongated tubes 37 are attached to a bottom plate 11 provided beneath the fuel rods 2, and to a top plate 12 at the downstream end 1a. The bottom plate 11, the elongated tubes 7, the top plate 12 and the spacers 9 form a support structure which carries the weight of the fuel rods 2.

The fuel assembly 1 also comprises a bottom piece 14. The bottom piece 14 extends to the upstream end 1a and defines the inlet 15 for the flow of coolant. The bottom piece 14 may be attached to the bottom plate 12.

The fuel assembly 1 of the sixth embodiment also comprises a debris filter 16 at the upstream minor portion 3 upstream the fuel rods 2.

As explained above in connection with the previous embodiments, each of the elongated tubes 37 according to the sixth embodiment comprises a bottom 20, an inlet 21 to the internal passage 8 at the upstream minor portion 3 and an outlet 22 from the internal passage 8 at the downstream minor portion 4.

The elongated tube 37 also comprises an inlet pipe 23, which forms the inlet 21 to the internal passage 8, as can be seen in FIG. 2. Advantageously, the flow area of the inlet 21 is smaller than the flow area of the outlet 22.

The inlet pipe 23 has an inlet end 24 and an outlet end 25. The outlet end 25 is located inside the internal passage 8 at a distance from the bottom 20. In such a way, a space 26 is formed in the internal passage 8 between the outlet end 25 and the bottom 20.

It should be noted, that the configuration of the inlet pipe 23 and the arrangement of the inlet pipe 23 in the elongated tube 37 in the sixth embodiment may be as in the first to fifth embodiments disclosed in FIGS. 2-5 and discussed above.

The present invention is not limited to the embodiments disclosed, but may be varied and modified within the scope of the following claims.

What is claimed is:

1. A fuel assembly configured to be positioned in a nuclear water reactor, comprising:
   an upstream minor portion defining an upstream end,
   a downstream minor portion defining a downstream end,
   a main portion connecting the upstream minor portion and the downstream minor portion,
   a plurality of elongated fuel rods arranged in parallel with a longitudinal axis extending through the upstream end and the downstream end,
   a flow interspace between the upstream end and the downstream end, the flow interspace being configured to permit a flow of coolant through the fuel assembly along a flow direction from the upstream end to the downstream end in contact with the fuel rods, and
   at least one elongated tube forming an internal passage extending through the main portion in parallel with the fuel rods and permitting a stream of the coolant through the internal passage,
   wherein the elongated tube comprises a bottom, an inlet to the internal passage at the upstream minor portion and an outlet from the internal passage at the downstream minor portion,
   wherein:
   the elongated tube comprises an inlet pipe positioned partially in the elongated tube, the inlet pipe forming the inlet to the elongated tube,
   the inlet pipe having an inlet end and an outlet end,
   the outlet end of the inlet pipe is located inside the internal passage at a distance of at least 0.2 m downstream from the bottom and at most 1 m downstream from the bottom, wherein the inlet pipe extends no more than 33% up into the elongated tube thereby forming a space in the internal passage between the outlet end of the inlet pipe and the bottom, a length of the inlet pipe configured to capture debris from the stream of coolant in the space in the internal passage between the outlet end of the inlet pipe and the bottom.

2. A fuel assembly according to claim 1, wherein the elongated tube has an inner diameter and wherein the inlet pipe at the outlet end has an outer diameter being smaller than the inner diameter of the elongated tube.

3. A fuel assembly according to claim 1, wherein the inlet end of the inlet pipe forms an opening which extends along a plane being non-parallel to the longitudinal axis.

4. A fuel assembly according to claim 1, wherein the inlet pipe extends through the bottom.

5. A fuel assembly according to claim 4, wherein the space is an annular space around the inlet pipe.

6. A fuel assembly according to claim 4, wherein the elongated tube comprises a bottom end plug forming said bottom and wherein the inlet pipe extends through the bottom end plug.

7. A fuel assembly according to claim 1, wherein the elongated tube is cylindrical.

8. A fuel assembly according to claim 1, wherein the elongated tube comprises at least one magnet provided to attract magnetic material towards the bottom.

9. A fuel assembly according to claim 1, wherein the fuel assembly comprises a debris filter at the upstream minor portion upstream the fuel rods.

10. A fuel assembly according to claim 9, wherein the inlet end of the inlet pipe is located upstream the debris filter.

11. A fuel assembly according to claim 9, wherein the inlet end of the inlet pipe is located downstream from the debris filter.

12. A fuel assembly according to claim 1, wherein the fuel assembly is configured to be positioned in a boiling water reactor, and wherein the elongated tube forms a water rod for conveying non-boiling water through the internal passage.

13. A fuel assembly according to claim 12, wherein the fuel assembly comprises at least two elongated tubes each forming a water rod for conveying non-boiling water through the respective internal passage.

14. A fuel assembly according to claim 1, wherein the fuel assembly is configured to be positioned in a pressure water reactor, and wherein the elongated tube forms a guide tube for receiving a control rod.

* * * * *